(12) United States Patent
Deruelle et al.

(10) Patent No.: US 8,012,593 B2
(45) Date of Patent: *Sep. 6, 2011

(54) TEXTILE COATING FORMULATIONS COMPRISING CROSSLINKABLE LIQUID SILICONES, METAL ALKOXIDES AND FUNCTIONAL COREACTANTS

(75) Inventors: Martial Deruelle, Millery (FR); Yves Giraud, Sainte Foy les Lyon (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/979,553

(22) Filed: Nov. 5, 2007

(65) Prior Publication Data

US 2008/0102289 A1 May 1, 2008

Related U.S. Application Data

(63) Continuation of application No. 10/780,679, filed on Feb. 19, 2004, now abandoned.

(60) Provisional application No. 60/491,261, filed on Jul. 31, 2003, provisional application No. 60/531,975, filed on Dec. 24, 2003.

(30) Foreign Application Priority Data

Feb. 19, 2003 (FR) .................................... 03 02024
Jun. 30, 2003 (FR) .................................... 03 07865
Nov. 18, 2003 (FR) .................................... 03 13456

(51) Int. Cl.
*B32B 25/20* (2006.01)
(52) U.S. Cl. ........................................ 428/447; 427/387
(58) Field of Classification Search .................. 428/447; 427/387

See application file for complete search history.

(56) References Cited

U.S. PATENT DOCUMENTS 5,391,680 A * 2/1995 Maruyama ...................... 528/38

* cited by examiner

*Primary Examiner* — Kuo-Liang Peng
(74) *Attorney, Agent, or Firm* — Buchanan Ingersoll & Rooney PC

(57) ABSTRACT

Crosslinkable liquid silicone compostions suited, on curing, for the long-lasting protective and/or applicational coating/ treatment of textile substrates, for example, for imparting softness, hydrophobicity, oleophobicity, hydrophilicity or antistatic properties thereto, comprise a formulation of (a) at least one particular polyorganosiloxane (POS) resin, (B) at least one metal alkoxide and/or polyalkoxide, or combination thereof with at least one optionally alkoxylated organosilane and/or at least one organosilicon compound bearing at least one epoxy, amino, ureido, isocyanato and/or isocyanurate substituent, (C) at least one functional coreactant therefor, (D), optionally, at least one nonreactive additive and (E), also optionally, at least one auxiliary agent other than an additive (D).

16 Claims, No Drawings

TEXTILE COATING FORMULATIONS COMPRISING CROSSLINKABLE LIQUID SILICONES, METAL ALKOXIDES AND FUNCTIONAL COREACTANTS

CROSS-REFERENCE TO PRIORITY/PROVISIONAL APPLICATIONS

This application is a continuing application of Ser. No. 10/780,679 filed Feb. 19, 2004, now abandoned, which claims priority under 35 U.S.C. §119 of FR 03/02024, filed Feb. 19, 2003, FR 03/07865, filed Jun. 30, 2003, FR 03/13456, filed Nov. 18, 2003, and of provisional application Ser. Nos. 60/491,261, filed Jul. 31, 2003, and 60/531,975, filed Dec. 24, 2003, each hereby expressly incorporated by reference and each assigned to the assignee hereof. This application is also a continuation of said '261 and '975 provisionals.

BACKGROUND OF THE INVENTION

1. Technical Field of the Invention

The field of the present invention is that of crosslinkable liquid silicone formulations capable of being used to form a coating which make it possible to introduce long-lasting properties to a large number of textile materials.

2. Description of Background and/or Related and/or Prior Art

Numerous treatments are applied to textile materials. They introduce thereto additional properties, such as, in particular: softness, hydrophilicity, hydrophobicity or oleophobicity. These treatments often consist in depositing, on the textile surface, polymers mainly of silicone type. For softness, these are long polydimethylsiloxanes oils (indeed even polyorganosiloxane gums). For hydrophilicity, these are aminated silicone oils or silicone oils comprising polyether groups. Organosilicon compounds or purely organic compounds which are fluorinated are incorporated when it is desired to introduce oleophobicity.

For some applications, such as, for example, water repellency of clothes, one of the desired characteristics is the permanence of the treatment. It is observed in practice that numerous current formulations do not allow satisfactory longevities to be achieved.

The introduction of a long-lasting function to a textile material is a difficult technique. It is known (cf. Patent DE-A-2-822,393) that, to improve the anchoring, it is desirable to produce covalent chemical bonds between the support and the compound which it is desired to deposit on the textile surface. Nevertheless, given the nature and the diversity of the polymers used to manufacture textile materials, this option is not always possible and, when it is possible, it remains specific to a certain type of support textile material.

SUMMARY OF THE INVENTION

The present invention thus features a treatment which makes it possible to introduce long-lasting properties to a large number of textile materials/substrates.

The present invention also features a treatment targeted at attaching a functional siloxane network to the surface of the textile material.

These features are achieved by the present invention, which relates to the use of at least one crosslinkable liquid silicone formulation as textile material coating base:

(i) for making it possible, by crosslinking around the constituent yarns, fibers and/or filaments of the textile material, to provide a broad protective coverage of the textile material, which protection is not very dependent on the nature of the said material because it requires few or no anchoring points;

(ii) for making it possible, by forming a chemically crosslinking silicone sheath, to provide long-lasting protection of the textile material by conferring thereon excellent resistance with regard to the attacks encountered during use: the expression "long-lasting protection" is understood to define protection, on the one hand, with regard to the restrictions imposed by textile processes, such as in particular heat-setting heat treatments or dyeing treatments, and, on the other hand, with regard to attacks experienced during the life of the textile material (for example an item of clothing), such as, in particular, abrasion while being worn, washing operations in a detergent aqueous medium or dry cleaning in a solvent medium;

(iii) for making it possible, by introducing additional specific additional functional groups, to form coatings having applicational properties, such as in particular softness, hydrophobicity, oleophobicity, hydrophilicity or an antistatic effect; and (iv) for making it possible, because of the special nature of the constituents of the formulation, to carry out the operations of depositing the liquid formulation and of crosslinking it at any point in the processes for preparing and/or restoring and/or maintaining the textile material.

Herein, the expression "textile material" denotes: first, the yarns, fibers and/or filaments made of synthetic and/or natural materials which are employed in the manufacture of textile articles; and, secondly, the textile articles themselves comprising at least one textile surface and consisting, for example, of woven, nonwoven and/or knitted articles; by extension, the expression "textile material" also denotes materials with a base texture having a fibrillar form, such as, in particular, paper and leather.

Thus, by virtue of the use of this formulation, a functional siloxane network is attached on a long-lasting basis to the textile surface and the treatment thus carried out makes it possible to successfully obtain the various advantageous properties mentioned above. It has also been observed that, in some cases, the treatment thus carried out not only does not in any way impede the subsequent dyeing of the textile material but can also create an effect of improving the fastness of the colors with regard to washing operations.

DETAILED DESCRIPTION OF BEST MODE AND SPECIFIC/PREFERRED EMBODIMENTS OF THE INVENTION

In a preferred embodiment of the invention, the crosslinkable liquid silicone formulation used as textile material coating base is that comprising:

(A) a system for creating a film-generating silicone network comprising at least one polyorganosiloxane (POS) resin containing, per molecule, on the one hand, at least two different siloxyl units selected from among those of M, D, T and Q types, one of the units being a T unit or a Q unit, and, on the other hand, at least three hydrolyzable/condensable groups of OH and/or $OR^1$ types, in which $R^1$ is a linear or branched $C_1$ to $C_6$, preferably C1 to C3, alkyl radical;

(B) a system for promoting the attachment of the said network to the surface of the textile material comprising:

either (B-1), at least one metal alkoxide of general formula:

$$M[(OCH_2CH)_aOR^2]n \qquad (I)$$

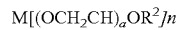

in which M is a metal selected from the group consisting of Ti, Zr, Ge, Si, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;

or (B-2), at least one metal polyalkoxide produced by the partial hydrolysis of the monomeric alkoxides of formula (I) indicated above in which the symbol $R^2$ is as defined above with the symbol a representing zero;

or a combination of (B-1) and (B-2);

or (B-3), a combination of (B-1) and/or (B-2) with:

(B-3/1), at least one optionally alkoxylated organosilane containing, per molecule, at least one $C_2$-$C_6$ alkenyl group, and/or (B-3/2), at least one organosilicon compound comprising at least one epoxy, amino, ureido, isocyanato and/or isocyanurate radical;

(C) a functional additive or coreactant comprising:

either (C-1), at least one silane and/or at least one POS which is essentially linear and/or at least one POS resin, each of these organosilicon compounds containing, per molecule, on the one hand, attaching functional group(s) (AF) capable of reacting with (A) and/or (B) or capable of generating, in situ, functional groups capable of reacting with (A) and/or (B) and, on the other hand, applicational functional group(s) (UF) which can be identical to or different from the AFs;

or (C-2), at least one hydrocarbonaceous compound comprising at least one saturated or unsaturated, linear or branched hydrocarbonaceous group and optionally one or more heteroatom(s) other than Si (such as, for example, an oxygen, fluorine or nitrogen atom) and existing in the form of a monomeric, oligomeric (linear, cyclic or branched) or polymeric (linear, cyclic or branched) structure, the said hydrocarbonaceous compound containing, per molecule, on the one hand, attaching functional group(s) (AF) capable of reacting with (A) and/or (B) or capable of generating, in situ, functional groups capable of reacting with (A) and/or (B) and, on the other hand, applicational functional group(s) (UF) which can be identical to or different from the AFs;

or a mixture of (C-1) and (C-2);

(D) optionally, a nonreactive additive system comprising:

(i) at least one organic solvent/diluent and/or one nonreactive organosilicon compound; (2i) and/or water, in the case of the use of a liquid silicone formulation in aqueous dispersion or emulsion; and (E) optionally, at least one auxiliary agent other than (D) known to this art which is chosen, when required, according in particular to the applications in which the textile materials treated in accordance with the invention are employed;

with the proviso that the formulation comprises (the parts are given by weight):

per 100 parts of constituent (A), of 0.5 to 200, preferably of 0.5 to 100 and more particularly of 1 to 70 parts of constituent (B), of 1 to 1,000, preferably of 1 to 300, parts of constituent (C), depending on the UF desired, of 0 to 10,000, preferably of 0 to 5,000, parts of constituent (D), and of 0 to 100 parts of constituent (E).

The constituents (A) which can be used, separately or as a mixture, are conventional film-forming resins, among which may be mentioned:

(A-1): at least one organosilicon resin prepared by cohydrolysis and cocondensation of chlorosilanes selected from the group consisting of those of formulae $(R^3)_3SiCl$, $(R^3)_2Si(Cl)_2$, $R^3Si(Cl)_3$ and $Si(Cl)_4$. These resins are branched organopolysiloxane oligomers or polymers which are well known and commercially available. They contain, in their structure, at least two different siloxyl units selected from among those of formulae $(R^3)_3SiO_{0.5}$ (M unit), $(R^3)_2SiO$ (D unit), $R^3SiO_{1.5}$ (T unit) and $SiO_2$ (Q unit), at least one of these units being a T or Q structural unit. The $R^3$ radicals are distributed such that the resins comprise approximately 0.8 to 1.8 $R^3$ radicals per silicon atom. Furthermore, these resins are not completely condensed and they still have approximately 0.001 to 1.5 OH and/or $OR^1$ alkoxyl groups per silicon atom.

The $R^3$ radicals are identical or different and are selected from among $C_1$-$C_6$ alkyl radicals which are linear or branched, $C_2$-$C_4$ alkenyl radicals, the phenyl radical or the 3,3,3-trifluoropropyl radical. Mention may be made, for example, as $R^3$ alkyl radicals, of the methyl, ethyl, isopropyl, tert-butyl and n-hexyl radicals.

Mention may be made, as examples of branched organopolysiloxane oligomers or polymers, of MQ resins, MDQ resins, TD resins and MDT resins, it being possible for the OH and/or $OR^1$ groups to be carried by the M, D and/or T units, the content by weight of OH and/or $OR^1$ groups being between 0.2% and 10% by weight.

(A-2): at least one mixed resin prepared by cocondensation of the organosilicon resins (A-1) indicated above with conventional organic polymers, such as: polyester and alkyd resins which are or are not modified by fatty acids, such as oleic, linoleic or ricinoleic acid, or esters of fatty acids and of aliphatic polyols, such as castor oil or tallow; epoxide resins which are or are not modified by fatty acids; phenolic, acrylic or melamine-formaldehyde resins; polyamides; polyimides; polyamideimides; polyureas; polyurethanes; polyethers; polycarbonates; or polyphenols.

Mention may be made, as concrete examples of constituents (A) which are preferred, of the mixtures (A-3):

of at least one resin of (A-1) type (resin (A-1/1)) containing, in its structure, at least two different siloxyl units selected from among those of formulae $(R^3)_3SiO_{0.5}$ (M unit), $(R^3)_2SiO$ (D unit) and $R^3SiO_{1.5}$ (T unit), at least one of these units being a T unit, it being possible for the OH and/or $OR^1$ groups to be carried by the M, D and/or T units and the content by weight of OH and/or $OR^1$ groups being between 0.2% and 10% by weight, and of at least one other resin of (A-1) type (resin (A-1/2)) containing, in its structure, at least two different siloxyl units selected from among those of formulae $(R^3)_3SiO_{0.5}$ (M unit), $(R^3)_2SiO$ (D unit) and $R^3SiO_{1.5}$ (T unit) and $SiO_2$ (Q unit), at least one of these units being a Q unit, it being possible for the OH and/or $OR^1$ groups to be carried by the M, D and/or T units and the content by weight of OH and/or $OR^1$ groups being between 0.2% and 10% by weight.

Mention may be made, as concrete examples of constituents (A) which are highly suitable, of the mixtures (A-3):

of at least one hydroxylated MDT resin having a content by weight of OH groups of between 0.2% and 10% by weight, and of at least one hydroxylated MQ resin having a content by weight of OH groups of between 0.2% and 10% by weight.

In the mixtures (A-3), the respective proportions of the constituents are not critical and can vary within wide limits.

These mixtures comprise, for example, 60% to 90% by weight of resin(s) (A-1/1) and 40% to 10% by weight of resin(s) (A-1/2).

As regards the constituents (B-1), mention may be made, as examples of $R^2$ in the organic derivatives of the metal M of formula (I), of the methyl, ethyl, propyl, isopropyl, butyl, isobutyl, hexyl, 2-ethylhexyl, octyl, decyl and dodecyl radicals.

Mention may be made, as concrete examples of constituents (B-1) which are preferred, of: alkyl titanates, such as ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate or the titanate of formula $Ti[(OCH_2CH_2)_2OCH_3]_4$; alkyl zirconates, such as propyl zirconate or butyl zirconate; alkyl silicates, such as methyl silicate, ethyl silicate, isopropyl silicate or n-propyl silicate; and mixtures of these products.

Mention may be made, as concrete examples of polyalkoxides (B-2) which are preferred, originating from the partial hydrolysis of monomeric titanates, zirconates and silicates, of: the polytitanates (B-2) originating from the partial hydrolysis of isopropyl, butyl or 2-ethylhexyl titanates; the polyzirconates (B-2) originating from the partial hydrolysis of propyl and butyl zirconates; the polysilicates (B-2) originating from the partial hydrolysis of ethyl and isopropyl silicates; and mixtures of these products.

Mention may be made, as concrete examples of constituents (B-3/1) which are preferred, of optionally alkoxylated organosilanes selected from the compounds of the following general formula:

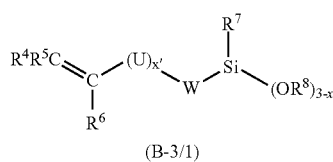

(B-3/1)

in which the radicals $R^4$, $R^5$ and $R^6$ are each a hydrogen atom or hydrocarbonaceous radical which may be identical to or different from one another and preferably represent hydrogen, a linear or branched $C_1$-$C_4$ alkyl or a phenyl radical optionally substituted by at least one $C_1$-$C_3$ alkyl radical; U is a linear or branched $C_1$-$C_4$ alkylene radical or a divalent radical of formula —CO—O-alkylene- where the alkylene moiety is as defined above and the right-hand free valency (in bold) is connected to the Si via W; W is a valency bond; the radicals $R^7$ and $R^8$, which may be identical or different, are each a linear or branched $C_1$-$C_4$ alkyl radical; x'=0 or 1; and x=0 to 2, preferably 0 or 1 and more preferably still 0.

Without this being limiting, vinyltrimethoxysilane or γ-(meth) acryloyloxypropyltrimethoxysilane can be regarded as a particularly appropriate compound (B-3/1).

Mention may be made, as concrete examples of constituents (B-3/2) which are preferred, of tris [(trialkoxysilyl) alkyl] isocyanurates, where the alkyl radicals have from 1 to 4 carbon atoms, and organosilicon compounds selected:
either from among the compounds (B-3/2-a) corresponding to the following general formula:

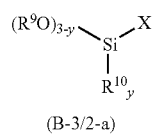

(B-3/2-a)

in which $R^9$ is a linear or branched $C_1$-$C_4$ alkyl radical; $R^{10}$ is a linear or branched alkyl radical; y is equal to 0, 1, 2 or 3, preferably to 0 or 1, and more preferably still to 0; X is the radical:

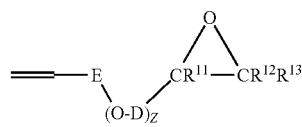

in which E and D, which may be identical or different, are each a linear or branched $C_1$-$C_4$ alkyl radical; z is equal to 0 or 1; the radicals $R^{11}$, $R^{12}$ and $R^{13}$, which may be identical or different, are each a hydrogen atom or a linear or branched $C_1$-$C_4$ alkyl radical, hydrogen being more particularly preferred; with the proviso that the radicals $R^{11}$ and $R^{12}$ or $R^{13}$ may together form, with the two carbons carrying the epoxy oxygen, an alkyl ring member having from 5 to 7 ring members,
or from among the compounds (B-3/2-b) composed of epoxyfunctional polydiorganosiloxanes comprising:
(i) at least one siloxyl unit of formula:

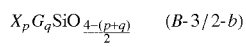

in which X is the radical as defined above for the formula (B-3/2-a); G is a monovalent hydrocarbonaceous radical which does not have an adverse influence on the activity of the catalyst and which is preferably selected from among alkyl radicals having from 1 to 8 carbon atoms inclusive, optionally substituted by at least one halogen atom, advantageously selected from among the methyl, ethyl, propyl and 3,3,3-trifluoropropyl radicals, and from among aryl radicals and advantageously from the xylyl and tolyl and phenyl radicals; p=1 or 2; q=0, 1 or 2; p+q=1, 2 or 3;
and (2i) optionally, at least one siloxyl unit of formula:

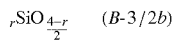

in which G is as defined above and r has a value of between 0 and 3, for example between 1 and 3.

The compounds (B-3/2) are preferably tris[3-(trimethoxysilyl) propyl] isocyanurates and epoxyalkoxymonosilanes (B-3/2-a).

Mention may be made, as examples of such compounds (B-3/2-a), of:
3-glycidoxypropyltrimethoxysilane (GLYMO),
3,4-epoxycyclohexylethyltrimethoxysilane.

For the implementation of the invention, use is more preferably made, as constituent (B), of the following titanates, ziconates and silicates (B-1), either alone or as a mixture with one another: ethyl titanate, propyl titanate, isopropyl titanate, butyl (n-butyl) titanate, propyl zirconate, butyl zirconate, ethyl silicate, propyl silicate and isopropyl silicate.

When (B-1)+(B-3/1) or (B-1)+(B-3/2) is used, the proportions by weight of (B-1) with respect to the (B-1)+(B-3/1) or (B-3/2) total are in particular from 5% to 100%, preferably from 8% to 80%.

Quantitatively, when (B-1)+(B-3/1)+(B-3/2) is used, it may be specified that the proportions by weight between (B-1), (B-3/1) and (B-3/2), expressed as percentages by weight with respect to the total of the three, are as follows:
(B-1) ≧1, preferably between 5 and 25,
(B-3/1) ≧10, preferably between 15 and 70,
(B-3/2) ≦90, preferably between 70 and 15,
it being understood that the sum of these proportions of (B-1), (B-3/1) and (B-3/2) is equal to 100%.

As regards the constituents (B-1), they can be composed of a metal alkoxide where the metal M can be partially connected to one or more ligands, such as, for example, those derived in particular from β-diketones, β-ketoesters and malonic esters (such as, for example, acetylacetone) or from triethanolamine.

The constituents (C-1) which can be used, separately or as a mixture, are silanes, POSs, which are essentially linear, and POS resins containing, in their molecules, attached to silicon atoms, the two functionalities AF and UF.

The AF functional groups are more specifically condensable/hydrolyzable functional groups corresponding to OH and/or OR or functional groups capable of generating, in situ, OH and/or OR$^1$ groups. As regards the UF functional groups, those which are more specifically targeted in the present invention, in the case of the constituents (C-1), are as follows:

(a) for introducing the properties of softness and/or of hydrophobicity, mention may be made of:
siloxane sequences comprising M, D and/or T units as defined above with respect to the constituents (A-1),
the non-salified aminoalkyl group, for example of general formula:

—R$^{14}$—NR$^{15}$R$^{16}$ or —R$^{14}$—NH—R$^{17}$—NR$^{15}$R$^{16}$ in which the radicals R$^{14}$ and R$^{17}$ are each a divalent hydrocarbonaceous radical, such as, for example, —(CH$_2$)$_e$— with e=1 to 10; R$^{15}$=H or —C$_i$H$_{2i+1}$; and R$^{16}$ has the same definition as R$^{15}$ and can be identical to or different from R$^{15}$, it being possible for the amino group thus to be primary, secondary or tertiary; according to alternative forms, the amino group can be included in a ring member or can be included in isocyanurate or HALS (Hindered Amine Light Stabilizer, such as, for example, a group of the piperidine type or other type) groups;

in practice, the aminoalkyl group is advantageously:
aminopropyl (H$_2$N) (CH$_2$)$_3$—;
N-methyl-3-aminopropyl (H$_3$CNH) (CH$_2$)$_3$—;
N-aminoethyl-3-aminopropyl (H$_2$N) (CH$_2$) 2NH(CH$_2$)$_3$—;
C$_6$H$_5$CH$_2$NH(CH$_2$)$_2$(NH) (CH$_2$)$_3$—;
3-ureidopropyl: (H$_2$NCONH) (CH$_2$)$_3$—;
3,4,5-dihydroimidazol-1-ylpropyl;

(b) for introducing the properties of oleophobicity, mention may be made of:
fluorinated groups, for example of general formula:

—Z—(—R$^F$)$_k$ in which Z is a divalent or trivalent linking radical of hydrocarbonaceous nature which can be a saturated or unsaturated aliphatic, aromatic or mixed aliphatic/aromatic, cyclic or noncyclic radical which can include one or more oxygenated heteroatoms and having from 1 to 30 carbon atoms; k is 1 or 2; R$^F$ represents the —C$_s$F$_{2s}$, —CF$_3$ group with s equal to or different from zero or the C$_s$F$_{2s}$H group with s equal to or greater than 1;

(c) for introducing the properties of hydrophilicity and/or of antistatic effect, mention may be made of:
polyether groups, for example of general formulae:

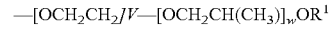

in which v and w are other than 0 and in particular ranging from 5 to 30.

Mention may be made, as concrete examples of constituents (C-1) which are preferred, of the organosilicon compounds indicated below:
polyalkoxysilanes of formula:

(R$^1$)$_b$Si[(OCH$_2$CH$_2$)$_a$OR$^2$]$_{4-b}$  (II)

in which the radicals R$^1$ and R$^2$ and the symbol a are as defined above with respect to the description of the constituents (A) and (B); and b is 1, 2 or 3;
essentially linear diorganopolysiloxanes comprising a hydroxyl group at each chain end, of formula:

(III)

in which the radicals the R$^{18}$, which may be identical or different, are each a saturated or unsaturated, substituted or unsubstituted, aliphatic, cyclic or aromatic monovalent C$_1$ to C$_{13}$ hydrocarbonaceous radical; j has a value sufficient to confer, on the diorganopolysiloxanes of formula (III), a dynamic viscosity at 25° C. ranging from 1,000 to 10,000 000 mPa·s; with the proviso that, in the context of the present invention, it is possible to use, as hydroxylated POSs of formula (III), a mixture comprised of several hydroxylated polymers which differ from one another by the value of the viscosity and/or the nature of the substituents bonded to the silicon atoms; with the further proviso that the POSs of formula (III) can optionally comprise T units of formula R$^{18}$SiO$_3$, and/or SiO$_2$ units in the proportion of at most 1% (these percentages expressing the number of T and/or Q units per 100 silicon atoms);

POS-polyether copolymers resulting in particular from the reaction: of a polyether of the formula:

CH$_2$=CH—CH$_2$—[OCH$_2$CH$_2$]$_v$—[OCH$_2$CH (CH$_3$)]$_w$—OH with a POS oil of formula:

Me$_3$SiO(Me$_2$SiO)x'(MeHSiO)y'SiMe$_3$, in which Me=methyl; v and w are other than 0 and in particular ranging from 5 to 30; x'ranging from 20 to 150; y'ranging from 2 to 10; with the proviso that the copolymer may have added to it an additive, such as a free polyether, for example in a proportion ranging from 40/60 to 60/40;

hydroxylated POS resins comprising, in their structure, T and optionally M and/or optionally D siloxyl units as defined above with respect to the resins A-1;

hydroxylated POS resins obtained in particular:
by hydrolysis of an alkoxysilane S substituted by UFs; it can relate, for example, to a UF substituted trialkoxysilane, which makes it possible to obtain a hydroxylated resin comprising T units, also referred to as T(OH) resin;
by homocondensation of hydrolyzed silanes S;
and by stripping (entrainment with steam) the hydrolysates deriving from the UFs;
mixtures of the abovementioned organosilicon compounds.

The UF functional groups substituting S correspond to the same definitions as those given above. Mention may be made, as advantageous illustration of this embodiment of a constituent (C-1) of POS resin type, of that obtained from hydrolyzed γ-aminopropyltriethoxysilane subjected to stripping with the ethanol formed by the hydrolysis. The polyhomocondensed resin obtained is a mixture of oligomers comprising from 4 to 10 silicon atoms and comprising units:

$T(OH) = RSi(OH)O_{2/2}$, $T = RSiO_{3/2}$, $T(OH)_2 = RSi(OH)_2O_{1/2}$, $T(OH)_3 = RSi(OH)_3$, these units being respectively present in a decreasing amount and $R = NH_2-(CH_2)_3-$. It is then an aminated T(OH) resin.

Mention may be made, as concrete examples of constituents (C-1) which are highly suitable, of hydroxylated MDT resins having a content by weight of OH groups of between 0.2% and 10% by weight, taken alone or as a mixture with hydroxylated silicone oils of formula (III).

With regard to the proportions in which the constituents (C-1) are employed, they are, as explained above, within the range from 1 to 1,000 parts by weight of constituent (C-1), depending on the desired UF, per 100 parts by weight of constituent (A). For example, in the case where the UF introduces hydrophobicity, from 2 to 30 parts by weight of constituent (C-1) are then generally used.

As will be seen from the definitions given above, in the case where the constituent (A) is a POS resin comprising T and optionally M and/or optionally D structural unit(s), it should be understood that this resin can then also act as water repellency functional additive (C-1), provided that it is used in sufficient proportions equal to the sum of the proportions corresponding to the combination (A)+(C-1).

The constituents (C-2) which can be used, separately or as a mixture, are hydrocarbonaceous compounds containing, in their molecule, attached to carbon atoms, the two AF and UF functionalities.

The AF functional groups are more specifically condensable/hydrolyzable functional groups corresponding to OH and/or $OR^1$ or functional groups capable of generating, in situ, OH and/or $OR^1$ functional groups. As regards the UF functional groups, those which are more specifically targeted in the present invention, in the case of the constituents (C-2), are those introducing properties of oleophobicity, of hydrophilicity and/or of antistatic effect.

Mention may be made, as concrete examples of constituents (C-2) which are preferred, of the hydrocarbonaceous compounds listed below:
(for the properties of oleophobicity) fluorinated alcohols, preferably perfluorinated alcohols, of formula:

$$R^{19}-OH \quad \quad (IV)$$

in which $R^{19}$ is a linear or branched aliphatic radical having from 2 to 20 carbon atoms, the said carbon atoms being substituted by at least one fluorine atom and optionally by at least one hydrogen atom;
(for the properties of hydrophilicity and/or of antistatic effect) unblocked polyethers of formula:

$$R^{20}-[OCH_2CH_2]_v-[OCH_2CH(CH_3)_w]-OH \quad \quad (V)$$

in which $R^{20}$ is a linear or branched alkyl radical having from 1 to 4 carbon atoms and the symbols v and w are as defined above.

Mention may be made, as concrete examples of constituents (C-2) which are highly suitable, of perfluorinated alcohols of formula $R^F-(CH)_m-OH$, in which $R^F$ is as defined above and m is a number ranging from 0 to 10.

With regard to the proportions in which the constituents (C-2) are employed, they are, as explained above, within the range from 1 to 1,000 parts by weight of constituent (C-2), depending on the desired UF, per 100 parts by weight of constituent (A).

Mention may be made, as concrete examples of optional constituents (D) which are preferred, of, in addition to water, the compounds listed below:
conventional organic solvents, some of which can act as diluents, selected from the group consisting of:
aliphatic solvents having from 5 to 20 carbon atoms, such as hexane, heptane, white spirit, octane or dodecane, and cycloaliphatic solvents, such as cyclohexane, methylcyclohexane or decalin;
chlorinated solvents, such as trichloroethylene, trichloroethane, perchloroethylene, perchloroethane or dichloromethane;
aromatic solvents, such as toluene or xylene;
alkanols, such as ethanol, isopropanol, butanol or octanol;
aliphatic ketones, such as acetone, methyl ethyl ketone or methyl butyl ketone, and cycloaliphatic ketones, such as cyclopentanone or cyclohexanone;
esters of nonfatty carboxylic acids and of alkanols, such as ethyl acetate, butyl acetate or pentyl acetate;
esters derived from saturated $C_{10}$ to $C_{16}$, preferably $C_{12}$ to $C_{14}$, fatty acids and from alkanols, such as myristates ($C_{14}$), laurates ($C_{12}$) and mixtures;
ethers, such as dibutyl ether, diisopropyl ether, ethylene glycol monomethyl ether, ethylene glycol monoethyl ether, diethylene glycol monoethyl ether or diethylene glycol monobutyl ether;
nonreactive linear diorganopolysiloxanes of formula:

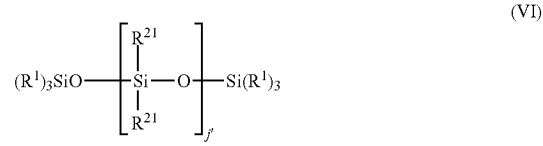

(VI)

in which the radicals $R^{21}$, which may be identical or different, have the same meanings as those given above for the reactive diorganopolysiloxane of formula (III); j' has a value sufficient to confer, on the polymers of formula (VI), a dynamic viscosity at 25° ranging from 10 to 200,000 mPa·s;
POS resins having the same definitions as those given above for the constituent (A) but which are devoid, in this instance, of any functional group of OH and/or $OR^1$ types. Mention may be made, as concrete examples of resins which can be used, of MQ, MDQ, TD and MDT resins.

Mention may be made, as concrete examples of optional auxiliary constituents (E) which are preferred, of the compounds indicated below:

appropriate fillers, among which will in particular be mentioned:

metal powders, such as zinc powder, aluminium powder or magnesium powder;

oxides, such as silica, ground quartz, alumina, zirconium, titanium, zinc or magnesium oxide or iron, cerium, lanthanum, praseodymium or neodymium oxides;

silicates, such as mica, talc, vermiculite, kaolin, feldspar or zeolites;

calcium carbonate, barium metaborate, iron, zinc or calcium pyrophosphates, zinc phosphate or carbon black;

pigments, such as phthalocyanines, chromium oxides, cadmium sulphide and cadmium sulphoselenides;

fungicides or bactericides known to this art;

thixotropic agents known to this art;

and, in the case of a crosslinkable liquid silicone formulation as an aqueous dispersion or emulsion, nonionic, ionic or amphoteric surface-active agents.

The liquid silicone formulations according to the present invention are well suited as textile coating bases and are prepared by simple mixing at ambient temperature, and in any order of introduction, of the constituents (A), (B), (C), (D) (optional) and (E) (optional). The amounts of each are as indicated above.

The constituents can be incorporated in any order but, however, it is preferable, to avoid any risk of precipitation of solid products or of formation of gel, to add the constituent (A) in the form of a solution in the solvent/diluent constituent (D) or in the form of an aqueous emulsion/dispersion, when the constituent (D) comprises water.

The introduction and the intimate mixing of the optional fillers (E), when they are used, with the constituents (A), (B), (C) and optionally (D) are carried out using conventional processes employed by manufacturers of textile formulations. Pebble mills or turbo mixers, for example, can be used for the mixing.

The formulations, textile coating bases, thus prepared exhibit the advantage of curing by simple drying in the air for a period of time which can range from a few tens of minutes to several hours or, if need be, several tens of hours. This period of time can be accelerated by heating at a temperature within the range from 50° C. to 180° C.

The textile coating bases thus prepared have an excellent stability on storage, similar to those of conventional paints, and can be employed in all textile applications requiring the presence, after curing, of long-lasting coatings possessing very good physical characteristics.

According to one advantageous characteristic, the crosslinkable liquid silicone formulations used as textile coating base can be prepared in the concentrated form (for example, from 0 to 100 parts of constituent (D) are used per 100 parts by weight of constituent (A) and can then subsequently be diluted at the time of their use with an organic diluent, an organic solvent or water, in the proportion of 1 to 30 parts by weight of formulation per 100 parts by weight of solvent, diluent or water.

The formulations according to the present invention can be directly applied onto textile articles comprising at least one textile surface and composed, for example, of woven, nonwoven and/or knitted articles.

The term "textile surface" is understood to mean a surface obtained by assembling yarns, fibers and/or filaments by any process, such as, for example, adhesive bonding, felting, weaving, braiding, flocking or knitting.

The yarns, fibers and/or filaments which are used for the manufacture of these textile articles can result from the conversion of a synthetic thermoplastic matrix composed of at least one thermoplastic polymer selected from the group consisting of: polyamides, polyolefins, poly(vinylidene chloride)s, polyesters, polyurethanes, acrylonitriles, (meth)acrylate/butadiene/styrene copolymers, their copolymers and their blends. The thermoplastic matrix can comprise additives, such as pigments, delustrants, matting agents, catalysts, heat and/or light stabilizers, or bactericidal, fungicidal and/or acaricidal agents. It can, for example, be a matting agent, for example selected from titanium dioxide particles and/or zinc sulphide particles.

The yarns, fibers and/or filaments can also result from natural materials, such as, in particular, cotton, flax or wool, according to conversion processes known to one skilled in this art. Of course, mixtures of synthetic and natural materials can be used.

According to the present invention, the textile coating base is applied to the article to be treated, via conventional techniques of the textile industry, in particular via the impregnation technique referred to as padding.

When the textile article is treated with a formulation comprising an organic diluent or solvent, it is desirable to subsequently subject this article to a heat treatment in order in particular to drive off the diluent or the solvent in the form of vapour.

Generally, the amount of textile coating base deposited on the textile article corresponds to an amount of between 0.1% and 10% by weight with respect to the weight of the dry treated textile article.

According to the present invention, the yarns, fibers and/or filaments can also be brought into contact with the textile coating base at any point in the processes for preparing and/or restoring and/or maintaining the textile material.

One or more depositions can be carried out, on the one hand on the textile articles and, on the other hand, on the yarns, fibers and/or filaments.

The term "yarn" is understood to mean, for example, a continuous multifilament object, a continuous yarn obtained by assembling several yarns or a continuous spun yarn of fibers, obtained from fibers of a single type, or from a mixture of fibers. The term "fiber" is understood to mean, for example, a short or long fiber, a fiber intended to be worked in spinning or for the manufacture of nonwoven articles or a tow intended to be cut to form short fibers.

The process for the manufacture of yarns, fibers and/or filaments generally begins by passing the thermoplastic matrix through a die and finishes before the stage of manufacturing the textile surface.

The process for the manufacture of yarns, fibers and/or filaments comprises in particular a spinning stage. The term "spinning stage" is understood to mean a specific operation consisting of the production of yarns, fibers and/or filaments. The spinning stage begins during the passage of the thermoplastic matrix through one or more dies and finishes by the transfer of the yarns, fibers and/or filaments obtained onto a bobbin (for the yarns or filaments) or into a pot (for the fibers), also referred to as winding up. The spinning stage can also comprise stages which are carried out between the stage of passing into the die and the stage of the winding process. These stages can, for example, be stages of sizing, of recombining the filaments (via one or more pick-up points or convergence guides), of drawing, of reheating the filaments, of relaxing and of heat setting.

Thus, the deposition, on the yarns, fibers and/or filaments, of the textile coating base in accordance with the present invention can be carried out, for example, after the convergence of the yarns, fibers and/or filaments and/or during a stage of drawing the yarns, fibers and/or filaments. The said deposition can also be carried out between these two stages. Preferably, the textile coating base in accordance with the present invention is deposited on the yarns, fibers and/or filaments during the sizing stage.

According to another preferred embodiment of the invention, a sizing composition comprising at least one textile coating base in accordance with the present invention is deposited on the yarns, fibers and/or filaments.

According to the present invention, the textile coating base in accordance with the present invention can also be deposited on the yarns, fibers and/or filaments during a treatment stage during the taking up of the yarns, fibers and/or filaments. The term "treatment stage" is understood to mean treatment stages after taking up the yarns, fibers and/or filaments, such as, for example, texturing, drawing, drawing-texturing, sizing, relaxing, heat-setting, twisting, setting, crimping, washing and/or dyeing stages. In particular, a textile coating base in accordance with the present invention can be deposited on the yarns, fibers and/or filaments during an operation selected from the group consisting of: relaxing, twisting, setting, crimping, drawing and/or texturing the yarns, fibers and/or filaments.

A sizing composition comprising at least one textile coating base in accordance with the present invention can also be deposited on the yarns, fibers and/or filaments, in particular during a treatment stage during the taking up of the yarns, fibers and/or filaments.

The yarns, fibers and/or filaments can also be placed in a washing and/or dyeing composition comprising at least one textile coating base in accordance with the present invention.

As indicated above, the textile coating base can also be employed during operations for restoring and/or maintaining the textile material, taken in the form of yarns, fibers and/or filaments or in the form of the textile articles themselves.

In a third general embodiment, the process of the present invention can be carried out in two steps:
in a first step: by bringing the yarns, fibers and/or filaments into contact with the textile coating base at any point in the processes for preparing the textile material; then
in a second step: by bringing the textile articles prepared from the treated yarns, fibers and/or filaments into contact, the contacting operation being carried out at any point in the processes for preparing (for fabrics) and/or restoring and/or maintaining (for clothes) the textile material.

The treatment with the textile coating base can be applied either partially or completely, on the one hand to the yarns, fibers and/or filaments and then, on the other hand, to the textile articles prepared from the treated yarns, fibers and/or filaments.

The expression "partially" is intended to define in particular an application which entails treating the yarns, fibers and/or filaments with a portion of the constituent ingredients of the textile coating base and in introducing the remainder during the treatment of the textile articles prepared from the treated yarns, fibers and/or filaments. For example, the system for promoting the attachment (constituent (B)) can be introduced during the treatment of the yarns, fibers and/or filaments, whereas the system for creating a network (constituent (A)) and the functional additive (constituent (C)) are introduced during the treatment of the articles.

The expression "completely" is intended to define an application where, on the one hand, the yarns, fibers and/or filaments and then, on the other hand, the textile articles prepared from these yarns, fibers and/or filaments are treated, each time, with a textile coating base comprising all its constituent ingredients, with the possibility that the latter are not necessarily present in the same proportions during the treatment of the yarns, fibers and/or filaments and then during the treatment of the articles.

It will also be appreciated that it is possible to carry out one or more depositions of the textile coating base (taken in all or in part) on the yarns, fibers and/or filaments and/or on the textile articles.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

Long-Lasting Hydrophobicity (1) Crosslinkable Liquid Silicone Formulation According to the Invention (Composition $C_1$)

It had the following composition (the parts are given by weight):

(A): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 47 parts; and of
hydroxylated MQ resin having 2% of OH by weight and composed of 45% by weight of $SiO_{4/2}$ units and 55% by weight of $(CH_3)_3SiO_{1/2}$ units: 7 parts;

(B): mixture of:
n-butyl (Bu) titanate of formula $Ti(OBu)_4$: 2 parts; and of
ethyl (Et) silicate of formula $Si(OEt)_4$: 4 parts;

(C): hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 10 parts;

(D): white spirit: 30 parts.

The composition was rediluted in solvent before application.

(2) Comparative Formulation (Composition $C_2$)

The performance of the composition ($C_1$) was compared with that of a conventional composition $C_2$ (Scotch Guard), which is a commercial product known for its excellent water-repelling properties. It was applied by spraying according to the protocol recommended by the supplier.

(3) Tests of Permanent Water Repellency

The treated textile article used was a knitted fabric made of polyamide-6,6 of the interlock knitting type produced on a double-needle-bed circular knitting machine with PA-6,6 yarns, texture 78 dtex 68 strands and 78 dtex 23 strands.

The textile article was treated by padding with 5% and 10% (by weight) solutions of the composition $C_1$ in heptane. It was subjected to drying at ambient temperature (23° C.) for 12 hours and then it was optionally heat treated at 150° C. for 3 minutes.

The beading effect was measured by the known standardized debeading test (Spray Test) (AATCC Test Method 22-1996)

The test entailed spraying the sample of the textile article with a given volume of water. The appearance of the sample was subsequently evaluated visually and compared with the standards. A grade from 0% to 100% was assigned according to the amount of water retained. For 0, the sample was completely wet, for 100%, the sample was completely dry.

In order to obtain a more quantitative measurement of the longevity performance of the depearling effect, the samples were weighed before and after spraying and the amount of water retained by the textile sample was determined by the difference. This amount was subsequently related to the amount of water initially retained by the unwashed textile sample.

In order to test the longevity of the treatment, a Girowash testing device (usually employed in the context of studying the stability of colours with regard to washing—described in Standard ISO 105 C06) was used. This system comprised a mechanical device which makes possible: the rotation at 40 revolutions/min of a wheel mounted on a horizontal axis, at least half of which is immersed in a bath heated to the desired temperature (in this instance, 50°); the attaching to this wheel of closed containers, made of stainless steel, each having a capacity of 550 ml, a diameter of 75 mm and a height of 125 mm, the bottom of the containers being 45 mm from the axis of the shaft. These containers were attached so as to be perpendicular to the axis of the rotor; the textile samples were positioned in these small containers in the presence of water-calibrated steel balls with a diameter of 6 mm were added in order to increase the turbulence and the abrasion during washing. After a given stirring time, the samples were removed and dried (12 hours at ambient temperature, 23° C.) and the pearling effect was measured by the test described above. The same samples were subsequently placed back in the Girowash testing device in order to continue the experiment.

Experimental Results

The results clearly show that the textile article treated with the composition $C_1$ according to the invention retained its water-repellency properties over time, whereas the conventional treatment with the composition C2 according to the prior art resulted in a significant reduction in its performance during the washing operations.

Ratio (Amount Retained on the Textile Sample after Washing for x Hours/Amount Retained Before Washing):

| Composition | Level in the Solution | Heat Treatment | Duration of Washing | | | | | |
|---|---|---|---|---|---|---|---|---|
| | | | 0 H | 4 H | 8 H | 11 H | 15 H | 38 H |
| $C_1$ | 5% | — | 1 | 0.83 | 0.98 | 0.63 | 0.76 | 0.43 |
| $C_1$ | 5% | 3 min-150° C. | 1 | 0.94 | 1.24 | 1.53 | 1.12 | 0.56 |
| $C_1$ | 10% | — | 1 | 1.90 | 1.28 | 1.21 | 1.34 | 1.14 |
| $C_1$ | 10% | 3 min-150° C. | 1 | 1.3 | 1.6 | — | 1.35 | 0.40 |
| $C_2$ | spray | — | 1 | 0.83 | 1.22 | 1.13 | 2.21 | 3.22 |
| $C_2$ | spray | 3 min-150° C. | 1 | 3.53 | 4.47 | 2.84 | 5.16 | 3.84 |

Grade Assigned in the Spray Test (%):

| Composition | Level in the Solution | Heat Treatment | Duration of Washing | | | | | |
|---|---|---|---|---|---|---|---|---|
| | | | 0 H | 4 H | 8 H | 11 H | 15 H | 38 H |
| $C_1$ | 5% | — | 80 | 80 | 80 | 80 | 80 | 88 |
| $C_1$ | 5% | 3 min-150° C. | 90 | 80 | 85 | 80 | 80 | 85 |
| $C_1$ | 10% | — | 80 | 80 | 80 | 80 | 80 | 85 |
| $C_1$ | 10% | 3 min-150° C. | 95 | 80 | 82 | 80 | 80 | 95 |
| $C_2$ | spray | — | 98 | 90 | 85 | 88 | 80 | 72 |
| $C_2$ | spray | 3 min-150° C. | 92 | 85 | 82 | 80 | 75 | 70 |

EXAMPLE 2

Long-lasting Hydrophobicity with Dyeing

The same composition $C_1$ was used, which in this instance was diluted to 14% (by weight) in heptane.

The textile used was a knitwear fabric made of polyamide-6,6 of the pique knitting type produced on a single-needle-bed circular knitting machine with a PA-6,6 yarn, 140 dtex 102 strands plaited every other drop.

In this example, a test of resistance to dyeing was carried out. The treatment protocol was as follows: impregnating, draining, drying at ambient temperature (23° C.) and then heat treatment at 150° C. for 10 minutes.

Experimental Results

A sample of the textile article treated with the composition $C_1$ was dyed in a Mathis Labomat laboratory dyeing device. The bath ratio was 1/50 and the following auxiliary products were used: sodium acetate 0.5 g/l; Sandogen CN 1%; Sandogen NH 1%. The dye Nylosan Blue N5GL was used at a dose of 1.2%. The temperature of the bath was raised at the rate of 1.5° C./min and the maximum temperature achieved was 98° C. The total duration of the dyeing was 45 minutes.

The sample emerged from the bath fully dyed. It largely retained its debeading properties (since its grading in the Spray Test changed from 90% to 80%).

The sample was subsequently subjected to a series of washing cycles in a machine at 50° C. for a total duration of 8 hours. At the end of this time, it retained debeading properties with a grading of 80% in the Spray Test.

EXAMPLE 3

Long-lasting Hydrophobicity—Resistance to Washing in an Industrial Machine

(1) Crosslinkable Liquid Silicone Formulation According to the Invention (Composition $C_3$)

It had the following composition (the parts are given by weight):
(A): mixture of:
hydroxylated MDT resin having 0.5% of OH by weight and composed of 62% by weight of $CH_3SiO_3$, units, 24% by weight of $(CH_3)_2SiO_{2/2}$ units and 14% by weight of $(CH_3)_3SiO_{1/2}$ units: 47 parts; and of
hydroxylated MQ resin having 2% of OH by weight and composed of 45% by weight of $SiO_{4/2}$ units and 55% by weight of $(CH_3)_3SiO_{1/2}$ units: 7 parts;
(B): mixture of:
tris (3-(trimethoxysilyl)propyl) isocyanurate: 7 parts;
n-propyl (Pr) zirconate of formula $Zr(OPr)_4$: 20 parts;
n-butyl (Bu) titanate of formula $Ti(OBu)_4$: 2 parts; and of
ethyl (Et) silicate of formula $Si(OEt)_4$: 4 parts;
(C-1): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(0H_3)_3SiO_{1/2}$ units: 10 parts; and of
hydroxylated linear silicone oil having on the order of 0.01% of OH by weight and composed of 100% by weight of $(CH_3)_2SiO_{2/2}$ units, having a viscosity of 4,000,000 mPas: 20.parts;
(D): white spirit: 883 parts.

(2) Crosslinkable Liquid Silicone Formulation According to the Invention (Composition $C_4$)

It had the following composition (the parts are given by weight):
(A): mixture of:
hydroxylated MDT resin having 0.5% of OH by weight and composed of 62% by weight of $CH_3SiO_{3/2}$ units, 24% by weight of $(CH_3)_2SiO_{1/2}$ units and 14% by weight of $(CH_3)_3SiO_{1/2}$ units: 95 parts; and of
hydroxylated MQ resin having 2% of OH by weight and composed of 45% by weight of $SiO_{4/2}$ units and 55% by weight of $(CH_3)_3SiO_{1/2}$ units: 14 parts;
(B): mixture of:
tris (3-(trimethoxysilyl)propyl) isocyanurate: 11 parts;
n-propyl (Pr) zirconate of formula $Zr(OPr)4$: 41 parts;
n-butyl (Bu) titanate of formula $Ti(OBu)_4$: 4 parts; and of
ethyl (Et) silicate of formula $Si(OEt)_4$: 8 parts;
(C-1): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 20 parts; and of
hydroxylated linear silicone oil having on the order of 0.01% of OH by weight and composed of 100% by weight of $(CH_3)_2SiO_{2/2}$ units, having a viscosity of 4,000,000 mPa·s: 80 parts;
(D): white spirit: 727 parts.

(3) Crosslinkable Liquid Silicone Formulation According to the Invention (Composition $C_5$)

It had the following composition (the parts are given by weight):
(A): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 40 parts; and of
hydroxylated MQ resin having 2% of OH by weight and composed of 45% by weight of $SiO_{4/2}$ units and 55% by weight of $(CH_3)_3SiO_{1/2}$ units: 6 parts;
(B): mixture of:
(3-aminopropyl) trimethoxysilane: 8 parts;
n-propyl (Pr) zirconate of formula $Zr(OPr)_4$: 18 parts;
n-butyl (Bu) titanate of formula $Ti(OBu)_4$: 2 parts; and of
ethyl (Et) silicate of formula $Si(OEt)_4$: 3 parts;
(C-1): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 10 parts; and of
hydroxylated linear silicone oil having on the order of 0.01% of OH by weight and composed of 100% by weight of $(CH_3)_2SiO_{2/2}$ units, having a viscosity of 4,000,000 mPa·s: 18 parts;
(D): white spirit: 895 parts.

(4) Crosslinkable Liquid Silicone Formulation According to the Invention (Composition $C_6$)

It had the following composition (the parts are given by weight):
(A): hydroxylated MDT resin having 0.8% of OH by weight and composed of 23% by weight of $CH_3SiO_{3/2}$ units, 75% by weight of $(CH_3)_2SiO_{2/2}$ units and 2% by weight of $(CH_3)_3SiO_{1/2}$ units: 58 parts (B): mixture of:
(3-aminopropyl)trimethoxysilafle: 8 parts; and of
n-propyl (Pr) zirconate of formula $Zr(OPr)_4$: 18 parts;
(C-1): mixture of:
hydroxylated MDT resin having 0.8% of OH by weight and composed of 23% by weight of $CH_3SiO_{3/2}$ units, 75% by weight of $(CH_3)_2SiO_{2/2}$ units and 2% by weight of $(CH_3)_3SiO_{1/2}$ units: 20 parts; and of
hydroxylated linear silicone oil having on the order of 0.01% of OH by weight and composed of 100% by weight of $(CH_3)_2SiO_{2/2}$ units, having a viscosity of 4,000,000 mPa·s: 25 parts;
(D): white spirit: 871 parts.

(5) Crosslinkable Liquid Silicone Formulation According to the Invention (Composition $C_7$)

It had the following composition (the parts are given by weight):
(A): hydroxylated MDT resin having 0.5% of OH by weight and composed of 62% by weight of $CH_3SiO_{31}$, units, 24% by weight of $(CH_3)_2SiO_{2/2}$ units and 14% by weight of $(CH_3)_3SiO_{1/2}$ units: 100 parts
(B): mixture of:
tris (3-(trimethoxysilyl)propyl) isocyanurate: 13 parts; and of
n-propyl (Pr) zirconate of formula $Zr(OPr)_4$: 41 parts
(C-1): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 41 parts; and of
hydroxylated linear silicone oil having on the order of 0.01% of OH by weight and composed of 100% by weight of $(CH_3)_2SiO_{2/2}$ units, having a viscosity of 4,000,000 mPa·s: 62 parts;
(D): white spirit: 743 parts.

(6) Comparative Formulation (Composition $C_8$)

The performances of the compositions $C_3$ to $C_7$ were compared with that of a conventional composition $C_8$ (known treatments sold under the trade names Scotch Guard or Teflon) known for its excellent water-repelling properties. It was applied via a solvent route according to the protocol recommended by the supplier.

(7) Tests of Permanent Water Repellency

The treated textile article used was a bistretch fabric based on polyamide-6,6 (80% by weight) and on elasthane (20%). This textile surface was woven in warp and weft from elasthane yarn, 44 dtex 1 strand, covered with polyamide-6,6, 44 dtex 34 strands. The elasticity of the textile surface obtained was 100% in each direction and the weight per surface area was on the order of 130 g/m².

The textile article was treated by padding with the compositions C3 to $C_8$. It was subjected to a heat treatment at 150° C. for 2 minutes and then it was stored at ambient temperature for 8 hours before the tests.

The beading effect was measured by the known standardized debeading test (Spray Test) (AATCC Test Method 22-1996)

To test the longevity of the treatment, an industrial washing machine of Washcator type (Electrolux) was used for continuous washing at 50° C. for variable durations of 8, 16 and 24 hours.

Experimental Results

The results clearly show that the textile article treated with the compositions $C_3$ to $C_7$ according to the invention retained its water-repellency properties over time and during washing at 50° C. under severe conditions of abrasion in a wet medium, whereas the conventional treatment with the composition $C_8$ according to the prior art results in a performance of the composition which plummets from the first hours of washing.

Grade Assigned in the Spray Test after Washing for x Hours (%):

| Composition | Heat Treatment | Duration of Washing: | | | |
|---|---|---|---|---|---|
| | | 0 H | 8 H | 16 H | 24 H |
| $C_3$ | 2 min 50° C. | 100 | 90 | 80 | 70 |
| $C_4$ | 2 min 50° C. | 100 | 90 | 80 | 80 |
| $C_5$ | 2 min 50° C. | 100 | 80 | 70 | 70 |
| $C_6$ | 2 min 50° C. | 100 | 80 | 70 | 70 |
| $C_7$ | 2 min 50° C. | 100 | 80 | 70 | 70 |
| $C_8$ | 2 min 50° C. | 100 | 50 | 0 | 0 |

Amount of Water Retained on the Textile Sample after Washing for x Hours (in g):

| Composition | Heat Treatment | Duration of Washing: | | | |
|---|---|---|---|---|---|
| | | 0 H | 8 H | 16 H | 24 H |
| $C_3$ | 2 min 50° C. | 0.31 | 0.33 | 0.59 | 0.93 |
| $C_4$ | 2 min 50° C. | 0.46 | 0.48 | 0.58 | 0.81 |
| $C_5$ | 2 min 50° C. | 0.24 | 0.39 | 0.65 | 0.90 |
| $C_6$ | 2 min 50° C. | 0.42 | 0.45 | 0.68 | 0.81 |
| $C_7$ | 2 min 50° C. | 0.32 | 0.62 | 0.77 | 1.04 |
| $C_8$ | 2 min 50° C. | 0.30 | 1.18 | 1.33 | 1.62 |

EXAMPLE 4

Permanent Oleophobicity (1) Crosslinkable Liquid Silicone Formulation According to the Invention ($C_9$)

It had the following composition (the parts are given by weight):
(A): mixture of:
hydroxylated MDT resin having 0.5% of OH by weight and composed of 62% by weight of $CH_3SiO_{3/2}$ units, 24% by weight of $(CH_3)_2SiO_{2/2}$ units and 14% by weight of $(CH_3)_3SiO_{1/2}$ units: 3.50 parts; and of
hydroxylated MQ resin having 2% of OH by weight and composed of 45% by weight of $SiO_{4/2}$ units and 55% by weight of $(CH_3)_3SiO_{1/2}$ units: 0.50 part;
(B): mixture of:
n-butyl (Bu) titanate of formula $Ti(OBu)4$: 2.25 parts; and of
ethyl (Et) silicate of formula $Si(OEt)_4$: 0.25 part;
(C-2): perfluorinated alcohol of formula $C_8F_{17}$—$C_2H_4$—OH (product sold under the reference Foralkyl EOH8 by Atofina): 2.0 parts;
(D): white spirit: 89.25 parts.

(2) Comparative Formulation ($C_{10}$)

perfluorinated alcohol of formula $C_8F_{17}$—$C_2H_4$—OH: 10 parts;
white spirit: 90 parts.

(3) Test of the Oleophobicity

The treated textile used was a woven textile made of polyamide-6,6 and elasthane (80/20). It was composed of elastic yarns in warp and weft based on an elasthane, 44 dtex, covered with some PA-6,6, 44 dtex/34 strands. These textile surfaces exhibit a high bidirectional elasticity (100% elongation in both directions) and a unit weight of 130 g/m.

The textile was treated by padding with the solution. It was subjected to drying at ambient temperature for a few minutes and is then heat treated at 150° C. for 2 minutes.

The oleophobic nature was measured by the standardized test (AATCC Test Method 118-1997) known under the name of "Oil repellency: Hydrocarbon Resistance Test". The test consisted in depositing drops of liquids with decreasing interfacial tensions on the textile and in determining the liquid LH starting from which spreading of the drops is observed. A grade of 0 to 8 was assigned depending on the LH obtained, 0 when liquid petrolatum spreads out (liquid paraffin, slight oleophobic nature), 3 when n-tetradecane spreads out (marked oleophobicity) and 8 when n-heptane no longer spreads out (very marked oleophobicity).

To test the longevity of the treatment, the samples were washed on 3 occasions at 50° C. in a commercial washing machine (Miele trademark, Novotronic 824 model) in the presence of a standardized detergent (ECE Non-Phosphate Reference Detergent A—the formulation of which is given in BS1006: 1900: UK-TO). The amount of detergent used was 96 g (as the volume of water used by the machine is 12/1, this amount corresponds to a conventional concentration of 8 g/l)

(4) Experimental Results

The results show that the textile treated with the formulation ($C_9$), which was functionalized oleophobic, clearly show properties of an oleophobicity which did not exist for the untreated textile. The results also show that the textile treated with the formulation ($C_9$) retained its properties of oleophobicity during the washing operations, whereas the performance of the textile treated solely with the fluorinated compound was completely lost.

Measurements of the Oleophobicity (Grade Obtained in the Oil Repellency Test)

| Composition | Treatment | Before Washing | After 3 Washing Cycles |
|---|---|---|---|
| Untreated | | 0 | 0 |
| $C_9$ | 2 min at 150° C | 3 | 3 |
| $C_{10}$ | 2 min at 150° C | 1 | 0 |

Each patent, patent application, publication and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A textile substrate coated with a crosslinkable liquid silicone composition suited, on curing, for the long-lasting protective and/or applicational coating/treatment of a textile substrate, said composition comprising a formulation of:
    (A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or $OR^1$ types, in which $R^1$ is a linear or branched $C_1$ to $C_6$ alkyl radical;
    (B) a compound or mixture of compounds selected from the group consisting of (B-1), (B-2), (B-3) and a mixture of (B-1) and (B-2),
    where:
    (B-1) is at least one metal alkoxide of general formula:

$$M[(OCH_2CH_2)_aOR^2]_n \quad (I)$$

in which M is a metal selected from the group consisting of Ti, Zr, Ge, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;
    (B-2) is at least one metal polyalkoxide produced by the partial hydrolysis of the monomeric alkoxides of formula (I) indicated above in which the symbol $R^2$ is as defined above with the symbol a representing zero; and
    (B-3) is a combination of (B-1) and/or (B-2) with:
        (B-3/1), at least one optionally alkoxylated organosilane containing, per molecule, at least one $C_2$-$C_6$ alkenyl group, and/or
        (B-3/2), at least one organosilicon compound comprising at least one epoxy, amino, ureido, isocyanato and/or isocyanurate radical;
    (C) a compound selected from the group consisting of (C-1), (C-2) and a mixture of (C-1) and (C-2):
    (C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and
    (C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;

(D) optionally, a nonreactive additive system comprising:
  (i) at least one organic solvent/diluent and/or at least one nonreactive organosilicon compound;
  (2i) and/or water, in the event of a liquid silicone formulation in aqueous dispersion or emulsion; and
(E) optionally, at least one auxiliary agent other than (D).

2. The textile substrate coated with the silicone composition as defined by claim 1, wherein the silicone composition coating the textile substrate is in a cured state.

3. The textile substrate as defined in claim 1, wherein
(B-1) is at least one compound selected from the group consisting of ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula Ti[(OCH$_2$CH$_2$)$_2$OCH$_3$]$_4$, propyl zirconate, butyl zirconate, and mixtures thereof; and
(B-2) is at least one compound selected from the group consisting of a polytitanate produced via the partial hydrolysis of isopropyl, butyl or 2-ethylhexyl titanate; a polyzirconate produced via the partial hydrolysis of propyl or butyl zirconate; a polysilicate produced via the partial hydrolysis of ethyl or isopropyl silicate; and mixtures thereof; and
(C) comprises an organosilicon compound selected from the group consisting of:
  (1) a polyalkoxysilane of formula:

in which the radicals $R^1$ and $R^2$ and the symbol a are as defined with respect to the constituents (A) and (B); and b is 1, 2 or 3;
  (2) an essentially linear diorganopolysiloxane comprising a hydroxyl group at each chain end, of formula:

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;
  (3) POS-polyether copolymers produced by the reaction: of a polyether of the formula:

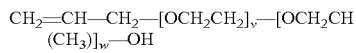

with a POS oil of formula:

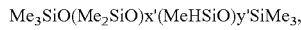

in which Me=methyl; v and w are other than 0; x' has a value from 20 to 150; y' has a value from 2 to 10; with the proviso that the copolymer may comprise an additive;
  (4) a hydroxylated POS resin comprising T and optionally M and/or optionally D siloxyl units as defined with respect to the resins (A-1);
  (5) a hydroxylated POS resin produced by hydrolysis of an alkoxysilane S substituted by UFs, by homocondensation of a hydrolyzed silane S, or by stripping the hydrolysates deriving from the UFs; and
  (6) mixtures thereof.

4. The textile substrate as defined by claim 3, wherein the silicone composition coating the textile substrate is in a cured state.

5. The textile substrate of claim 1, wherein (C) comprises an organosilicon compound selected from the group consisting of:
  (1) a polyalkoxysilane of formula:

in which the radicals $R^1$ and $R^2$ and the symbol a are as defined with respect to the constituents (A) and (B); and b is 1, 2 or 3;
  (2) an essentially linear diorganopolysiloxane comprising a hydroxyl group at each chain end, of formula:

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;
  (3) POS-polyether copolymers produced by the reaction: of a polyether of the formula:

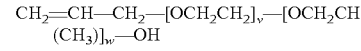

with a POS oil of formula:

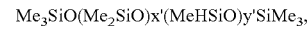

in which Me=methyl; v and w are other than 0; x' has a value from 20 to 150; y' has a value from 2 to 10; with the proviso that the copolymer may comprise an additive;
  (4) a hydroxylated POS resin comprising T and optionally M and/or optionally D siloxyl units as defined with respect to the resins (A-1);
  (5) a hydroxylated POS resin produced by hydrolysis of an alkoxysilane S substituted by UFs, by homocondensation of a hydrolyzed silane S, or by stripping the hydrolysates deriving from the UFs; and (6) mixtures thereof.

6. A textile substrate having individual strands, wherein the individual strands have a protective sheath therearound, said protective sheath comprising a silicone composition comprising:

(A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or $OR^1$ types, in which $R^1$ is a linear or branched $C_1$ to $C_6$ alkyl radical;

(B) a compound or mixture of compounds selected from the group consisting of (B-1), (B-2), (B-3) and a mixture of (B-1) and (B-2),
where:

(B-1) is at least one metal alkoxide of general formula:

$$M[(OCH_2CH_2)_aOR^2]_n \quad (I)$$

in which M is a metal selected from the group consisting of Ti, Zr, Ge, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;

(B-2) is at least one metal polyalkoxide produced by the partial hydrolysis of the monomeric alkoxides of formula (I) indicated above in which the symbol $R^2$ is as defined above with the symbol a representing zero; and (B-3) is a combination of (B-1) and/or (B-2) with:
(B-3/1), at least one optionally alkoxylated organosilane containing, per molecule, at least one $C_2$-$C_6$ alkenyl group, and/or
(B-3/2), at least one organosilicon compound comprising at least one epoxy, amino, ureido, isocyanato and/or isocyanurate radical;

(C) a compound selected from the group consisting of (C-1), (C-2) and a mixture of (C-1) and (C-2):

(C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and (C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;

(D) optionally, a nonreactive additive system comprising:
(i) at least one organic solvent/diluent and/or at least one nonreactive organosilicon compound;
(2i) and/or water, in the event of a liquid silicone formulation in aqueous dispersion or emulsion; and (E) optionally, at least one auxiliary agent other than (D).

7. The textile substrate as defined by claim 6, wherein:

(B-1) is at least one compound selected from the group consisting of ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula $Ti[(OCH_2CH_2)_2OCH_3]_4$, propyl zirconate, butyl zirconate, and mixtures thereof; and (B-2) is at least one compound selected from the group consisting of a polytitanate produced via the partial hydrolysis of isopropyl, butyl or 2-ethylhexyl titanate; a polyzirconate produced via the partial hydrolysis of propyl or butyl zirconate; a polysilicate produced via the partial hydrolysis of ethyl or isopropyl silicate; and mixtures thereof; and (C) comprises an organosilicon compound selected from the group consisting of:

(1) a polyalkoxysilane of formula:

$$(R^1)_b SI[(OCH_2CH_2)_a OR^2]_{4-b} \quad (II)$$

in which the radicals $R^1$ and $R^2$ and the symbol a are as defined with respect to the constituents (A) and (B); and b is 1, 2 or 3;

(2) an essentially linear diorganopolysiloxane comprising a hydroxyl group at each chain end, of formula:

$$HO-\left[\begin{array}{c} R^{18} \\ | \\ SiO \\ | \\ R^{18} \end{array}\right]_j -H \quad (III)$$

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;

(3) POS-polyether copolymers produced by the reaction: of a polyether of the formula:

$$CH_2=CH-CH_2-[OCH_2CH_2]_v-[OCH_2CH(CH_3)]_w-OH$$

with a POS oil of formula:

$$Me_3SiO(Me_2SiO)x'(MeHSiO)y'SiMe_3,$$

in which Me=methyl; v and w are other than 0; x' has a value from 20 to 150; y' has a value from 2 to 10; with the proviso that the copolymer may comprise an additive;
(4) a hydroxylated POS resin comprising T and optionally M and/or optionally D siloxyl units as defined with respect to the resins (A-1);
(5) a hydroxylated POS resin produced by hydrolysis of an alkoxysilane S substituted by UFs, by homocondensation of a hydrolyzed silane S, or by stripping the hydrolysates deriving from the UFs; and
(6) mixtures thereof.

8. The textile substrate of claim 6, wherein (C) comprises an organosilicon compound selected from the group consisting of:
(1) a polyalkoxysilane of formula:

$$(R^1)_b Si[(OCH_2CH_2)_a OR^2]_{4-b} \quad (II)$$

in which the radicals $R^1$ and $R^2$ and the symbol a are as defined with respect to the constituents (A) and (B); and b is 1, 2 or 3;
(2) an essentially linear diorganopolysiloxane comprising a hydroxyl group at each chain end, of formula:

(III)

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;
(3) POS-polyether copolymers produced by the reaction: of a polyether of the formula:

$$CH_2=CH-CH_2-[OCH_2CH_2]_v-[OCH_2CH(CH_3)]_w-OH$$

with a POS oil of formula:

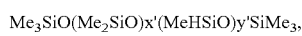

$$Me_3SiO(Me_2SiO)x'(MeHSiO)y'SiMe_3,$$

in which Me=methyl; v and w are other than 0; x' has a value from 20 to 150; y' has a value from 2 to 10; with the proviso that the copolymer may comprise an additive;
(4) a hydroxylated POS resin comprising T and optionally M and/or optionally D siloxyl units as defined with respect to the resins (A-1);
(5) a hydroxylated POS resin produced by hydrolysis of an alkoxysilane S substituted by UFs, by homocondensation of a hydrolyzed silane S, or by stripping the hydrolysates deriving from the UFs; and
(6) mixtures thereof.

9. A method for imparting softness, hydrophobicity, oleophobicity, hydrophilicity or antistatic properties to a textile substrate, comprising depositing thereon a thus effective amount of a silicone composition comprising:
(A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or $OR^1$ types, in which $R^1$ is a linear or branched $C_1$ to $C_6$ alkyl radical;
(B) a compound or mixture of compounds selected from the group consisting of (B-1), (B-2), (B-3) and a mixture of (B-1) and (B-2),
where:
(B-1) is at least one metal alkoxide of general formula:

$$M[(OCH_2CH_2)_a OR^2]_n \quad (I)$$

in which M is a metal selected from the group consisting of Ti, Zr, Ge, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;
(B-2) is at least one metal polyalkoxide produced by the partial hydrolysis of the monomeric alkoxides of formula (I) indicated above in which the symbol $R^2$ is as defined above with the symbol a representing zero; and
(B-3) is a combination of (B-1) and/or (B-2) with:
(B-3/1), at least one optionally alkoxylated organosilane containing, per molecule, at least one $C_2$-$C_6$ alkenyl group, and/or
(B-3/2), at least one organosilicon compound comprising at least one epoxy, amino, ureido, isocyanato and/or isocyanurate radical;
(C) a compound selected from the group consisting of (C-1), (C-2) and a mixture of (C-1) and (C-2):
(C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and
(C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;
(D) optionally, a nonreactive additive system comprising:
(i) at least one organic solvent/diluent and/or at least one nonreactive organosilicon compound;

(2i) and/or water, in the event of a liquid silicone formulation in aqueous dispersion or emulsion; and (E) optionally, at least one auxiliary agent other than (D), and thence curing said composition.

10. The method of claim 9, wherein:

(B-1) is at least one compound selected from the group consisting of ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula $Ti[(OCH_2CH_2)_2OCH_3]_4$, propyl zirconate, butyl zirconate, and mixtures thereof; and (B-2) is at least one compound selected from the group consisting of a polytitanate produced via the partial hydrolysis of isopropyl, butyl or 2-ethylhexyl titanate; a polyzirconate produced via the partial hydrolysis of propyl or butyl zirconate; a polysilicate produced via the partial hydrolysis of ethyl or isopropyl silicate; and mixtures thereof; and (C) comprises an organosilicon compound selected from the group consisting of:

(1) a polyalkoxysilane of formula:

$$(R^1)_b Si[(OCH_2CH_2)_a OR^2]_{4-b} \quad (II)$$

in which the radicals $R^1$ and $R^2$ and the symbol a are as defined with respect to the constituents (A) and (B); and b is 1, 2 or 3;

(2) an essentially linear diorganopolysiloxane comprising a hydroxyl group at each chain end, of formula:

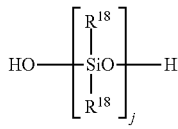

(III)

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;

(3) POS-polyether copolymers produced by the reaction: of a polyether of the formula:

$$CH_2\!=\!CH\!-\!CH_2\!-\![OCH_2CH_2]_v\!-\![OCH_2CH(CH_3)]_w\!-\!OH$$

with a POS oil of formula:

$$Me_3SiO(Me_2SiO)x'(MeHSiO)y'SiMe_3,$$

in which Me=methyl; v and w are other than 0; x' has a value from 20 to 150; y' has a value from 2 to 10; with the proviso that the copolymer may comprise an additive;

(4) a hydroxylated POS resin comprising T and optionally M and/or optionally D siloxyl units as defined with respect to the resins (A-1);

(5) a hydroxylated POS resin produced by hydrolysis of an alkoxysilane S substituted by UFs, by homocondensation of a hydrolyzed silane S, or by stripping the hydrolysates deriving from the UFs; and (6) mixtures thereof.

11. A method for the treatment of a textile substrate, comprising directly depositing thereon a silicone composition comprising:

(A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or $OR^1$ types, in which $R^1$ is a linear or branched $C_1$ to $C_6$ alkyl radical;

(B) a compound or mixture of compounds selected from the group consisting of (B-1), (B-2), (B-3) and a mixture of (B-1) and (B-2), where:

(B-1) is at least one metal alkoxide of general formula:

$$M[(OCH_2CH_2)_a OR^2]_n \quad (I)$$

in which M is a metal selected from the group consisting of Ti, Zr, Ge, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;

(B-2) is at least one metal polyalkoxide produced by the partial hydrolysis of the monomeric alkoxides of formula (I) indicated above in which the symbol $R^2$ is as defined above with the symbol a representing zero; and (B-3) is a combination of (B-1) and/or (B-2) with:

(B-3/1), at least one optionally alkoxylated organosilane containing, per molecule, at least one $C_2$-$C_6$ alkenyl group, and/or (B-3/2), at least one organosilicon compound comprising at least one epoxy, amino, ureido, isocyanato and/or isocyanurate radical;

(C) a compound selected from the group consisting of (C-1), (C-2) and a mixture of (C-1) and (C-2):

(C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and (C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;
(D) optionally, a nonreactive additive system comprising:
(i) at least one organic solvent/diluent and/or at least one nonreactive organosilicon compound;
(2i) and/or water, in the event of a liquid silicone formulation in aqueous dispersion or emulsion; and
(E) optionally, at least one auxiliary agent other than (D); and thereafter curing said composition.

12. The method of claim 11, wherein:
(B-1) is at least one compound selected from the group consisting of ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula $Ti[(OCH_2CH_2)_2OCH_3]_4$, propyl zirconate, butyl zirconate, and mixtures thereof; and
(B-2) is at least one compound selected from the group consisting of a polytitanate produced via the partial hydrolysis of isopropyl, butyl or 2-ethylhexyl titanate; a polyzirconate produced via the partial hydrolysis of propyl or butyl zirconate; a polysilicate produced via the partial hydrolysis of ethyl or isopropyl silicate; and mixtures thereof; and
(C) comprises an organosilicon compound selected from the group consisting of:
(1) a polyalkoxysilane of formula:

$(R^1)_b Si[(OCH_2CH_2)_a OR^2]_{4-b}$ (II)

in which the radicals $R^1$ and $R^2$ and the symbol a are as defined with respect to the constituents (A) and (B); and b is 1, 2 or 3;
(2) an essentially linear diorganopolysiloxane comprising a hydroxyl group at each chain end, of formula:

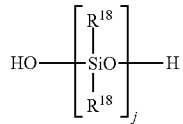

(III)

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;
(3) POS-polyether copolymers produced by the reaction: of a polyether of the formula:

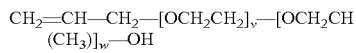

$CH_2=CH-CH_2-[OCH_2CH_2]_v-[OCH_2CH(CH_3)]_w-OH$ with a POS oil of formula:

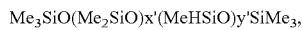

$Me_3SiO(Me_2SiO)x'(MeHSiO)y'SiMe_3$, in which Me=methyl; v and w are other than 0; x' has a value from 20 to 150; y' has a value from 2 to 10; with the proviso that the copolymer may comprise an additive;
(4) a hydroxylated POS resin comprising T and optionally M and/or optionally D siloxyl units as defined with respect to the resins (A-1);
(5) a hydroxylated POS resin produced by hydrolysis of an alkoxysilane S substituted by UFs, by homocondensation of a hydrolyzed silane S, or by stripping the hydrolysates deriving from the UFs; and
(6) mixtures thereof.

13. A method for the treatment of a textile substrate, comprising coating the individual yarns, fibers and/or filaments of which, at any point in the preparation, restoration and/or maintenance thereof, with a silicone composition comprising:
(A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or $OR^1$ types, in which $R^1$ is a linear or branched $C_1$ to $C_6$ alkyl radical;
(B) a compound or mixture of compounds selected from the group consisting of (B-1), (B-2), (B-3) and a mixture of (B-1) and (B-2),
where:
(B-1) is at least one metal alkoxide of general formula:

$M[(OCH_2CH_2)_a OR^2]n$ (I)

in which M is a metal selected from the group consisting of Ti, Zr, Ge, Mn and Al; n=valency of M; the $R^2$ substituents, which may be identical or different, are each a linear or branched $C_1$ to $C_{12}$ alkyl radical; a represents zero, 1 or 2; with the provisos that, when the symbol a represents zero, the alkyl radical $R^2$ has from 2 to 12 carbon atoms and, when the symbol a represents 1 or 2, the alkyl radical $R^2$ has from 1 to 4 carbon atoms;
(B-2) is at least one metal polyalkoxide produced by the partial hydrolysis of the monomeric alkoxides of formula (I) indicated above in which the symbol $R^2$ is as defined above with the symbol a representing zero; and
(B-3) is a combination of (B-1) and/or (B-2) with:
(B-3/1), at least one optionally alkoxylated organosilane containing, per molecule, at least one $C_2$-$C_6$ alkenyl group, and/or
(B-3/2), at least one organosilicon compound comprising at least one epoxy, amino, ureido, isocyanato and/or isocyanurate radical;
(C) a compound selected from the group consisting of (C-1), (C-2) and a mixture of (C-1) and (C-2):
(C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and
(C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;

(D) optionally, a nonreactive additive system comprising:
  (i) at least one organic solvent/diluent and/or at least one nonreactive organosilicon compound;
  (2i) and/or water, in the event of a liquid silicone formulation in aqueous dispersion or emulsion; and
(E) optionally, at least one auxiliary agent other than (D), and thereafter curing said composition.

14. The method of claim 13, wherein:
(B-1) is at least one compound selected from the group consisting of ethyl titanate, propyl titanate, isopropyl titanate, butyl titanate, 2-ethylhexyl titanate, octyl titanate, decyl titanate, dodecyl titanate, β-methoxyethyl titanate, β-ethoxyethyl titanate, β-propoxyethyl titanate, the titanate of formula Ti[(OCH$_2$CH$_2$)$_2$OCH$_3$]$_4$, propyl zirconate, butyl zirconate, and mixtures thereof; and
(B-2) is at least one compound selected from the group consisting of a polytitanate produced via the partial hydrolysis of isopropyl, butyl or 2-ethylhexyl titanate; a polyzirconate produced via the partial hydrolysis of propyl or butyl zirconate; a polysilicate produced via the partial hydrolysis of ethyl or isopropyl silicate; and mixtures thereof; and
(C) comprises an organosilicon compound selected from the group consisting of:
  (1) a polyalkoxysilane of formula:

in which the radicals R$^1$ and R$^2$ and the symbol a are as defined with respect to the constituents (A) and (B); and b is 1, 2 or 3;
  (2) an essentially linear diorganopolysiloxane comprising a hydroxyl group at each chain end, of formula:

in which the radicals R$^{18}$, which may be identical or different, are each a saturated or unsaturated, substituted or unsubstituted, aliphatic, cyclic or aromatic monovalent C$_1$ to C$_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula R$^{18}$SiO$_{3/2}$ and/or SiO$_2$ units in the proportion of at most 1%, these percentages expressing the number of T and/or Q structural units per 100 silicon atoms;
  (3) POS-polyether copolymers produced by the reaction: of a polyether of the formula:

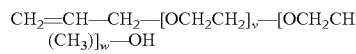

with a POS oil of formula:

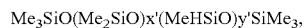

in which Me=methyl; v and w are other than 0; x' has a value from 20 to 150; y' has a value from 2 to 10; with the proviso that the copolymer may comprise an additive;
  (4) a hydroxylated POS resin comprising T and optionally M and/or optionally D siloxyl units as defined with respect to the resins (A-1);
  (5) a hydroxylated POS resin produced by hydrolysis of an alkoxysilane S substituted by UFs, by homocondensation of a hydrolyzed silane S, or by stripping the hydrolysates deriving from the UFs; and
  (6) mixtures thereof.

15. A textile substrate coated with a crosslinkable liquid silicone composition suited, on curing, for the long-lasting protective and/or applicational coating/treatment of a textile substrate, consisting essentially of a formulation of:
(A) at least one polyorganosiloxane (POS) resin containing, per molecule, at least two different siloxyl units selected from among those of M, D, T and Q types, one of said structural units being a T unit or a Q unit, and at least three hydrolyzable/condensable groups of OH and/or OR$^1$ types, in which R$^1$ is a linear or branched C$_1$ to C$_6$ alkyl radical;
(B) a compound or mixture of compounds selected from the group consisting of (B-1), (B-2), (B-3) and a mixture of (B-1) and (B-2),
  where:
  (B-1) is at least one metal alkoxide of general formula:

in which M is a metal selected from the group consisting of Ti, Zr, Ge, Mn and Al; n=valency of M; the R$^2$ substituents, which may be identical or different, are each a linear or branched C$_1$ to C$_{12}$ alkyl radical; a represents zero, 1 or 2; with the provisos that, when the symbol a represents zero, the alkyl radical R$^2$ has from 2 to 12 carbon atoms and, when the symbol a represents 1 or 2, the alkyl radical R$^2$ has from 1 to 4 carbon atoms;
  (B-2) is at least one metal polyalkoxide produced by the partial hydrolysis of the monomeric alkoxides of formula (I) indicated above in which the symbol R$^2$ is as defined above with the symbol a representing zero; and
  (B-3) is a combination of (B-1) and/or (B-2) with:
    (B-3/1), at least one optionally alkoxylated organosilane containing, per molecule, at least one C$_2$-C$_6$ alkenyl group, and/or
    (B-3/2), at least one organosilicon compound comprising at least one epoxy, amino, ureido, isocyanato and/or isocyanurate radical;
(C) a compound selected from the group consisting of (C-1), (C-2) and a mixture of (C-1) and (C-2):
  (C-1) at least one silane and/or at least one POS which is essentially linear and/or at least one POS resin, each of said organosilicon compounds containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from said AFs; and (C-2) at least one hydrocarbonaceous compound comprising at least one saturated or unsaturated, linear or branched hydrocarbonaceous radical and optionally one or more heteroatom(s) other than Si and existing in the form of a monomeric, oligomeric (linear, cyclic or branched) or polymeric (linear, cyclic or branched) structure, the said hydrocarbonaceous compound containing, per molecule, attaching functional group(s) (AF) capable of reacting with (A) and/or (B) or capable of generating, in situ, functional groups capable of reacting with (A) and/or (B) and applicational functional group(s) (UF) which can be identical to or different from the AFs;

(D) optionally, a nonreactive additive system comprising:
(i) at least one organic solvent/diluent and/or at least one nonreactive organosilicon compound;
(2i) and/or water, in the event of a liquid silicone formulation in aqueous dispersion or emulsion; and (E) optionally, at least one auxiliary agent other than (D).

16. The textile substrate of claim 15, wherein (C) comprises an organosilicon compound selected from the group consisting of:

(1) a polyalkoxysilane of formula:

 (II)

in which the radicals $R^1$ and $R^2$ and the symbol a are as defined with respect to the constituents (A) and (B); and b is 1, 2 or 3;

(2) an essentially linear diorganopolysiloxane comprising a hydroxyl group at each chain end, of formula:

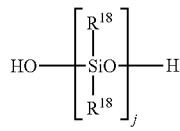 (III)

in which the radicals $R^{18}$, which may be identical or different, are each a saturated or unsaturated, substituted or unsubstituted, aliphatic, cyclic or aromatic monovalent $C_1$ to $C_{13}$ hydrocarbonaceous radical; j has a value sufficient to confer, on the diorganopolysiloxanes of formula (III), a dynamic viscosity at 25° C. ranging from 1,000 to 10,000,000 mPa·s; with the proviso that the hydroxylated POSs of formula (III) may be a mixture of several hydroxylated polymers which differ from each other by the value of the viscosity and/or the nature of the substituents bonded to the silicon atoms; with the further proviso that the POSs of formula (III) can optionally comprise T units of formula $R^{18}SiO_{3/2}$ and/or $SiO_2$ units in the proportion of at most 1%, these percentages expressing the number of T and/or Q structural units per 100 silicon atoms;

(3) POS-polyether copolymers produced by the reaction: of a polyether of the formula:

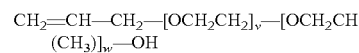

with a POS oil of formula:

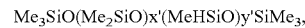

in which Me=methyl; v and w are other than 0; x' has a value from 20 to 150; y' has a value from 2 to 10; with the proviso that the copolymer may comprise an additive;

(4) a hydroxylated POS resin comprising T and optionally M and/or optionally D siloxyl units as defined with respect to the resins (A-1);

(5) a hydroxylated POS resin produced by hydrolysis of an alkoxysilane S substituted by UFs, by homocondensation of a hydrolyzed silane S, or by stripping the hydrolysates deriving from the UFs; and (6) mixtures thereof.

* * * * *